(12) United States Patent
Staudinger et al.

(10) Patent No.: US 8,137,237 B2
(45) Date of Patent: Mar. 20, 2012

(54) DEVICE FOR ACTUATING A PLURALITY OF HYDRAULIC CONTROL CYLINDERS

(75) Inventors: Martin Staudinger, Ettlingen (DE); Eric Mueller, Kaiserslautern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1074 days.

(21) Appl. No.: 12/069,491

(22) Filed: Feb. 11, 2008

(65) Prior Publication Data

US 2008/0207392 A1 Aug. 28, 2008

(30) Foreign Application Priority Data

Feb. 12, 2007 (DE) .......................... 10 2007 006 802

(51) Int. Cl.
*B60W 10/04* (2006.01)
*B60K 17/10* (2006.01)

(52) U.S. Cl. ....................................... 477/34; 74/473.11
(58) Field of Classification Search ..................... 477/34; 74/473.11
See application file for complete search history.

(56) References Cited

U.S. PATENT DOCUMENTS

| | | | | |
|---|---|---|---|---|
| 3,709,065 A | * | 1/1973 | Starling | 475/128 |
| 3,882,980 A | * | 5/1975 | Blake | 192/3.57 |
| 4,111,071 A | * | 9/1978 | Pearce et al. | 475/127 |
| 2006/0040787 A1 | * | 2/2006 | Dreher | 477/34 |

* cited by examiner

*Primary Examiner* — Edwin A Young
(74) *Attorney, Agent, or Firm* — Simpson & Simpson, PLLC

(57) ABSTRACT

A device for actuating a plurality of hydraulic control cylinders having a pressure regulating valve with a first and a second pressure regulating output, a first selector valve connected downline from the pressure regulating outputs, a second selector valve connected downline from the first selector valve, having a plurality of individual pressure outputs, where the second pressure regulating output is optionally assignable through the first and second selector valves to one of the individual pressure outputs, and the particular individual pressure outputs that are not assigned to the second pressure regulating output are assignable to the first pressure regulating output.

8 Claims, 2 Drawing Sheets

DEVICE FOR ACTUATING A PLURALITY OF HYDRAULIC CONTROL CYLINDERS

CROSS REFERENCE TO RELATED APPLICATIONS

This patent claims priority of German Patent Application No. 10 2007 006 802.8, filed Feb. 12, 2007, which application is incorporated herein by reference.

FIELD OF THE INVENTION

The invention relates to a device for actuating a plurality of hydraulic control cylinders.

BACKGROUND OF THE INVENTION

Devices for actuating a plurality of hydraulic control cylinders can be employed, for example, in motor vehicles for hydraulic actuation of a shift transmission. The shift transmission may be a double-clutch transmission. For that purpose it is known, for example, to actuate the control cylinders by means of a pressure regulating valve and a rotary valve connected downline from the latter.

BRIEF SUMMARY OF THE INVENTION

The object of the invention is to provide an alternative and/or improved device for actuating a plurality of hydraulic control cylinders.

The problem is solved with a device for actuating a plurality of hydraulic control cylinders having a pressure regulating valve with a first and a second pressure regulating output, a first selector valve connected downline from the pressure regulating outputs and a second selector valve connected downline from the first selector valve, where the second pressure regulating output is optionally assignable through the first and second selector valves to one of the individual pressure outputs, and the particular individual pressure outputs that are not assigned to the second pressure regulating output are assignable to the pressure regulating output.

Advantageously, because of the series connection of the pressure regulating valve and the two selector valves, one of the individual pressure outputs of the second selector valve can be connected to the second pressure regulating output, i.e., it can, for example, be pressurized. All of the remaining individual pressure outputs of the second selector valve can simultaneously be assigned to the first pressure regulating output, i.e., they can, for example, be switched to zero pressure. Ideally, the pressure conditions prevailing in the pressure regulating outputs of the pressure regulating valve can be reversed, so that, for example, one of the individual pressure outputs can also optionally be switched to zero pressure and the others can be pressurized.

One preferred exemplary embodiment is characterized in that a shared connection is assigned to the first pressure regulating output. The particular control cylinders that are not connected to the second pressure regulating output can be brought advantageously to one and the same pressure level by way of the shared connection.

Other preferred exemplary embodiments are characterized in that four of the control cylinders are assigned to the shared connection and four others of the control cylinders are assigned to the individual pressure outputs. In this case the assigned shifting transmission can thus have a total of eight control cylinders, which are normally designed to operate in opposing pairs, each pair being designed to operate a selector fork to engage two gears. The interconnection with the shared connection can be accomplished in this case by having each of the double cylinders connected to the shared connection on one side and to one of the individual pressure outputs on the other side. This makes it possible to always pressurize one of the control cylinders connected to the individual pressure outputs, while all of the other control cylinders are switched to zero pressure, it being possible to accomplish this through the manifold and the selector valves that can switch the other individual pressure outputs to the manifold.

Consequently, when the pressure conditions are reversed by the pressure regulating valve, the pressure conditions on all eight control cylinders can be reversed, so that seven of the control cylinders in all are pressurized and the remaining control cylinder, which is connected to the second pressure regulating output through the corresponding individual pressure output, is without pressure. Thus all conceivable selector positions of the control cylinders can be selected through appropriate connection with the pressure regulating valve and the two selector valves.

Other preferred exemplary embodiments are characterized in that the first selector valve has a first switching input and a first and a second switching output, where the first switching input is connected downline from the second pressure regulating output and is optionally assignable to one of the switching outputs, while the other switching output is assignable to the shared connection. By means of this interconnection it is thus possible for the pressure conditions prevailing in the pressure regulating output to be forwarded optionally to one of the switching outputs, while the other switching output is assignable to the shared connection or the first pressure regulating output.

Other preferred exemplary embodiments are characterized in that the second selector valve has a second switching input that is connected downline from the first switching output and a third switching input that is connected downline from the second switching output. The downline connection of the second selector valve can thus be accomplished through the second and third switching inputs.

Other preferred exemplary embodiments are characterized in that the second switching input of the second selector valve is optionally assignable to a first or second individual pressure output and the third switching input of the second selector valve is optionally assignable to third and fourth individual pressure outputs of the second selector valve, the particular unassigned individual pressure output being assignable to the shared connection. Because of the series connection of the first selector valve and the second selector valve, the second pressure regulating output can thus optionally be switched to one of the first through fourth individual pressure outputs of the second selector valve. Advantageously, here the other individual pressure outputs are assignable to the shared connection, either directly through the second selector valve or indirectly through the first switching output of the first selector valve.

The problem is also solved by using a device as described above in a hydraulic system of a hydraulic shifting transmission, in particular a double-clutch transmission.

BRIEF DESCRIPTION OF THE DRAWINGS

Additional advantages, characteristics and details are evident from the following description, in which an exemplary embodiment is described in detail with reference to the drawing. Same, similar and/or functionally equivalent parts are provided with the same reference labels. The figures show the following.

DETAILED DESCRIPTION OF THE INVENTION

Figure 1:
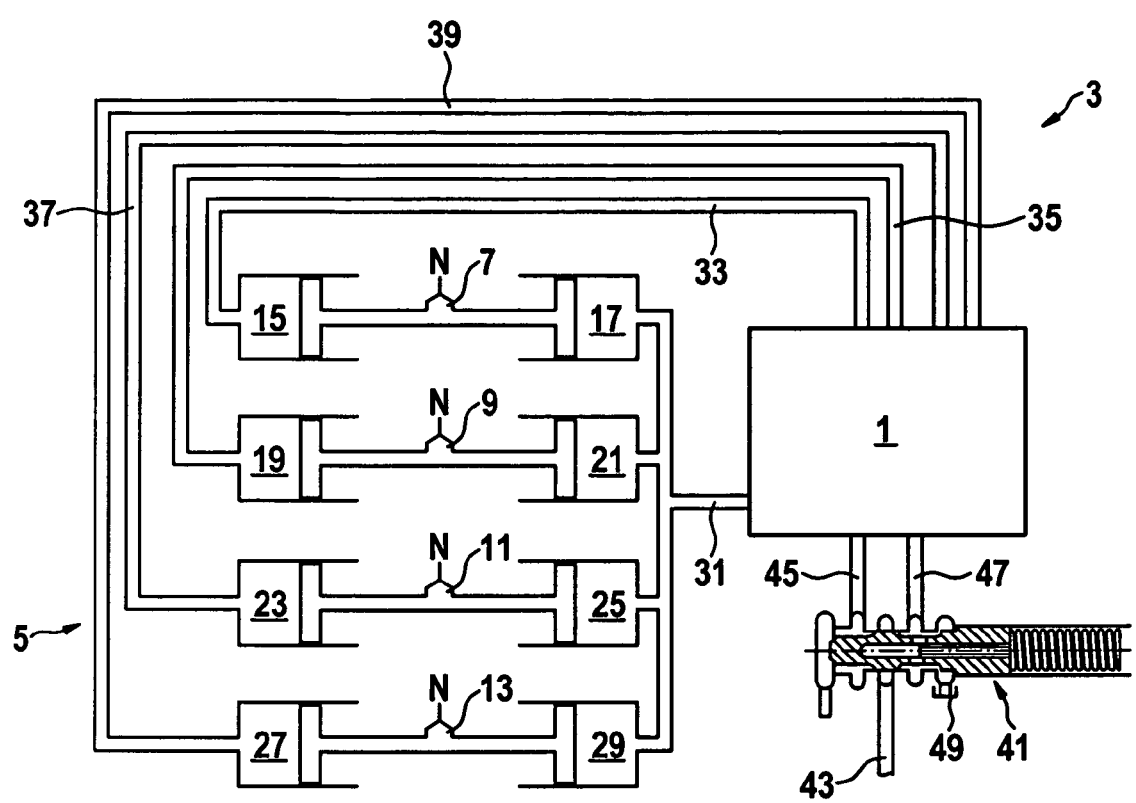
FIG. 1 illustrates a part of a hydraulically actuated double-clutch transmission with a total of eight double-acting control cylinders working in pairs.

FIG. 1 shows device 1 as part of hydraulic control 3 of double-clutch transmission 5. Double-clutch transmission 5 has first selector fork 7, second selector fork 9, third selector fork 11 and fourth selector fork 13. Selector forks 7 through 13 are designed to optionally engage one of two gears of double-clutch transmission 5. First selector fork 7 and second selector fork 9, for example, may be designed to engage the uneven gears. Correspondingly, third selector fork 11 and fourth selector fork 13 may be designed to engage the even gears of double-clutch transmission 5.

Selector forks 7 through 13 are assigned to a plurality of control cylinders. First selector fork 7 is assigned to first control cylinder 15 and second control cylinder 17. Second selector fork 9 is assigned to third control cylinder 19 and fourth control cylinder 21. Third selector fork 11 is assigned to fifth control cylinder 23 and sixth control cylinder 25. Fourth selector fork 13 is assigned to seventh control cylinder 27 and eighth control cylinder 29. The control cylinders assigned to one of selector forks 7 through 13 are designed to act in opposite directions, so that, for example, a higher pressure in first control cylinder 15 than in second control cylinder 17 results in a movement of first selector fork 7 toward the right, seen in the orientation of FIG. 1, and vice versa.

Control cylinders 17, 21, 25 and 29 are all similarly fluidly assigned to shared connection 31 through a multiple branch. Shared connection 31 issues into device 1 for actuating control cylinders 15 through 29. Control cylinders 15, 19, 23 and 27 are also connected to device 1, but each one individually. More precisely, first control cylinder 15 is assigned to device 1 through first individual pressure output 33, third control cylinder 19 through second individual pressure output 35, fifth control cylinder 23 through third individual pressure output 37 and seventh control cylinder 27 through fourth individual pressure output 39.

Downline, device 1 is connected to pressure regulating valve 41 having pressure regulating input 43, first pressure regulating output 45 and second pressure regulating output 47. Pressure regulating valve 41 is designed to optionally apply pressure to pressure regulating outputs 45 and 47, where the particular pressure regulating output to which pressure is not applied may be switched to zero pressure or is connectable to tank 49. Device 1 is designed to optionally connect one of the individual pressure outputs 33 through 39 to first pressure regulating output 45, while the other individual pressure outputs 33 through 39 and the shared connection 31 are connectable to second pressure regulating output 47. In this way it is possible to apply pressure optionally to control cylinders 15, 19, 23 and 27 while the other control cylinders are pressureless, and vice versa. Whether the particular control cylinder actuated by device 1 is pressureless or is under pressure depends on the selector position of pressure regulating valve 41, or upon which of pressure regulating outputs 45 and 47 is pressureless or is under pressure.

Figure 2:
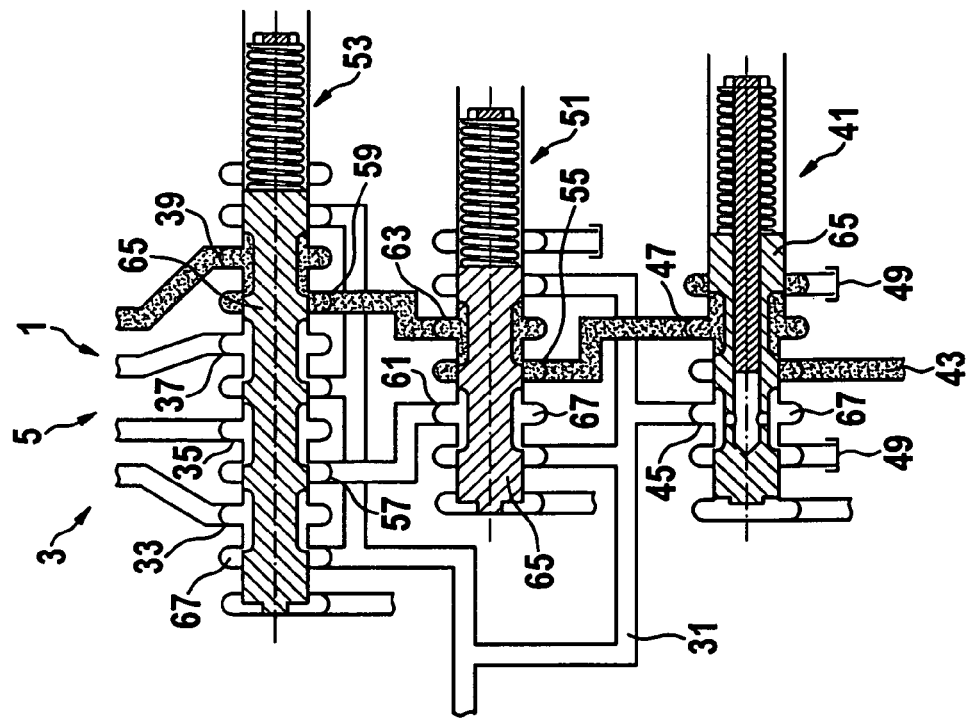
FIG. 2 illustrates a device for actuating the control cylinders shown in FIG. 1, with a pressure regulating valve in a first position; and, FIG. 3 illustrates the device shown in FIG. 2, but with the pressure regulating valve in a second position.

FIG. 2 shows a detailed view of device 1 employed in FIG. 1 with pressure regulating valve 41 in a first selector position, with first pressure regulating output 45 under pressure and second pressure regulating output 47 switched to tank 49.

Figure 3:
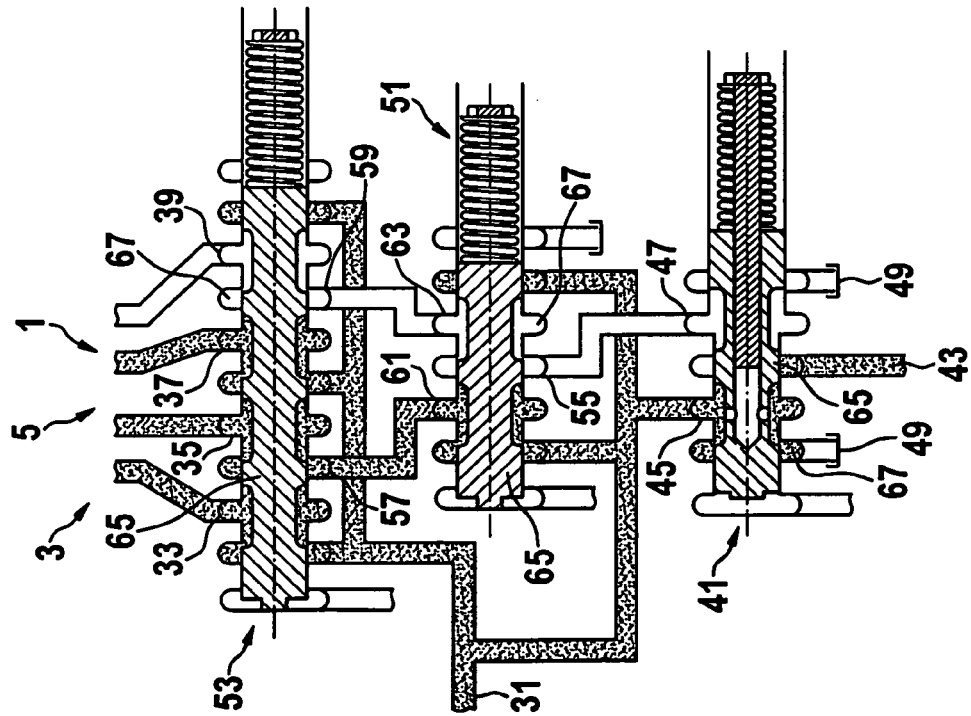

FIG. 3 shows device 1 shown in FIG. 2, but with pressure regulating valve 41 in an alternate selector position, where first pressure regulating output 45 is switched to tank 49 and second pressure regulating output 47 is connected to pressure regulating input 43, i.e., is under pressure.

In FIGS. 2 and 3, lines carrying pressure are shaded with dots.

Pressure regulating input 43 can be assigned to a hydraulic energy source, for example an electrically or mechanically operated hydraulic pump of double-clutch transmission 5. The hydraulic energy source is not shown in further detail in FIGS. 1 through 3.

In addition to pressure regulating valve 1, device 1 has first selector valve 51 and second selector valve 53. Selector valves 51 and 53 and pressure regulating valve 41 may be hydraulically actuated valves, for example. It is also conceivable, however, for the valves to be actuated electrically, for example by means of magnets or proportional magnets. First selector valve 51 has first switching input 55. Second selector valve 53 has second switching input 57 and third switching input 59. In addition, first selector valve 51 has first switching output 61 and second switching output 63. First switching output 61 of first selector valve 51 is assigned to second switching input 57 of second selector valve 53. Second switching output 63 of first selector valve 51 is assigned to third switching input 59 of second selector valve 53.

Second selector valve 53 has individual pressure outputs 33 through 39 of device 1.

As can be seen in FIGS. 2 and 3, in the selector position shown a path is connected from second pressure regulating output 47 of pressure regulating valve 41 to fourth individual pressure output 39, namely through first switching input 55, first selector valve 51, second switching output 63, third switching input 59 and, finally, second selector valve 53. According to FIG. 2, the open path is switched to zero pressure and shared connection 31 is under pressure, and vice versa according to FIG. 3.

Each of valves 41, 51 and 53 can basically assume two different selector positions, so that a total of eight different selector positions of device 1 result. In addition, pressure regulating valve 41 can assume intermediate positions to regulate pressure. By means of selector valves 51 and 53 four different paths can be connected, leading from second pressure regulating output 47 of pressure regulating valve 41 alternatively to one at a time of individual pressure outputs 33 through 39. These four different switch states of selector valves 51 and 53 can each be subjected to pressure or not in two different selector positions of pressure regulating valve 41. The eight gears of double-clutch transmission 5 can be shifted by means of these eight combinations of selector positions.

Pressure regulating valve 41 and selector valves 51 and 53 are designed as valves with multiple control pistons 65 which interact with plurality of control grooves 67, as can be seen in FIGS. 2 and 3. Alternatively, it is conceivable to use other valve elements, for example slides or seats. The various inputs and outputs of valves 41, 51 and 53 can each be assigned to one of control grooves 67 in a known manner, where the control grooves can be closed or connected with each other by pairs if appropriate by means of various control pistons 65, also in a known manner. In order to realize the cascading series connection of valves 41, 51 and 53, the respective valve inputs and outputs are assigned alternately to different control grooves 67.

It is apparent that two selector valves 51 and 53 can replace a rotary valve for actuating control cylinders 15 through 29, known, for example, from the existing art, while retaining the same function. By means of pressure regulating valve 41, either an individual pressure can be adjusted on one of the 5 control cylinders situated at the left, viewed in the orientation of FIG. 1, or when pressure regulating valve 41 is reversed the pressure can be switched to shared connection 31, which then, depending on the positions of two selector valves 51 and 53, applies pressure to the seven remaining control pistons.

By simply switching two selector valves 51 and 53 back and forth, one at a time the individual pressure outputs 33 through 39 can be the only ones to be pressurized or the only ones to be pressure-free, while the other connections exhibit the opposite pressure conditions. Advantageously, it is possible by means of device 1 with only one proportional valve, pressure regulating valve 41 and two very simple, inexpensive valves, first selector valve 51 and second selector valve 53, to actuate eight control pistons of eight control cylinders 15 through 29 for four selector forks 7 through 13.

REFERENCE LABELS 1 device
3 hydraulic control
5 double-clutch transmission
7 first selector fork
9 second selector fork
11 third selector fork
13 fourth selector fork
15 first control cylinder
17 second control cylinder
19 third control cylinder
21 fourth control cylinder
23 fifth control cylinder
25 sixth control cylinder
27 seventh control cylinder
29 eighth control cylinder
31 shared connection
33 first individual pressure output
35 second individual pressure output
37 third individual pressure output
39 fourth individual pressure output
41 pressure regulating valve
43 pressure regulating input
45 first pressure regulating output
47 second pressure regulating output
49 tank
51 first selector valve
53 second selector valve
55 first switching input
57 second switching input
59 third switching input
61 first switching output
63 second switching output
65 control piston
67 control grooves

What is claimed is:

1. A device (1) for actuating a plurality of hydraulic control cylinders (15, 17, 19, 21, 23, 25, 27, 29), comprising:
   a pressure regulating valve (41) with a first and a second pressure regulating output (45, 47);
   a first selector valve (51) connected downline from the pressure regulating outputs (45, 47);
   a second selector valve (53) connected downline from the first selector valve (51), with a plurality of individual pressure outputs (33, 35, 37, 39); wherein the second pressure regulating output (47) is optionally assignable through the first and second selector valves (51, 53) to one of the individual pressure outputs (33, 35, 37, 39), and the individual pressure outputs (33, 35, 37, 39) that are not assigned to the second pressure regulating output (47) are assignable to the first pressure regulating output (45).

2. The device recited in claim 1, wherein a shared connection (31) is assigned between at least a portion of the plurality of hydraulic control cylinders and the first pressure regulating output (45).

3. The device recited in claim 2, wherein four of the control cylinders (17, 21, 25, 29) are assigned to the shared connection (31) and four others of the control cylinders (15, 19, 23, 27) are assigned to the individual pressure outputs (33, 35, 37, 39).

4. The device recited in claim 2, wherein the first selector valve (51) has a first switching input (55) and a first and a second switching output (61, 63), where the first switching input (55) is connected downline from the second pressure regulating output (47) and is optionally assignable to one of the switching outputs (61, 63), while the other switching output (61, 63) is assignable to the shared connection (31).

5. The device recited in claim 4, wherein the second selector valve (53) has a second switching input (57) that is connected downline from the first switching output (61) and a third switching input (59) that is connected downline from the second switching output (63).

6. The device recited in claim 5, wherein the second switching input (57) of the second selector valve (53) is optionally assignable to a first or second individual pressure output (33, 35) and the third switching input (59) of the second selector valve (53) is optionally assignable to a third or fourth individual pressure output (37, 39) of the second selector valve (53), the particular unassigned individual pressure output (33, 35, 37, 39) being assignable to the shared connection (31).

7. A hydraulic shift transmission comprising a device (1) for actuating a plurality of hydraulic control cylinders (15, 17, 19, 21, 23, 25, 27, 29), including:
   a pressure regulating valve (41) with a first and a second pressure regulating output (45, 47);
   a first selector valve (51) connected downline from the pressure regulating outputs (45, 47);
   a second selector valve (53) connected downline from the first selector valve (51), with a plurality of individual pressure outputs (33, 35, 37, 39); wherein the second pressure regulating output (47) is optionally assignable through the first and second selector valves (51, 53) to one of the individual pressure outputs (33, 35, 37, 39), and the individual pressure outputs (33, 35, 37, 39) that are not assigned to the second pressure regulating output (47) are assignable to the first pressure regulating output (45).

8. The hydraulic shift transmission recited in claim 7 wherein said hydraulic shift transmission comprises a double-clutch transmission (5).

* * * * *